Sept. 12, 1967    J. J. YUST    3,340,905
WIRE TIER AND CUTTER
Filed June 21, 1965
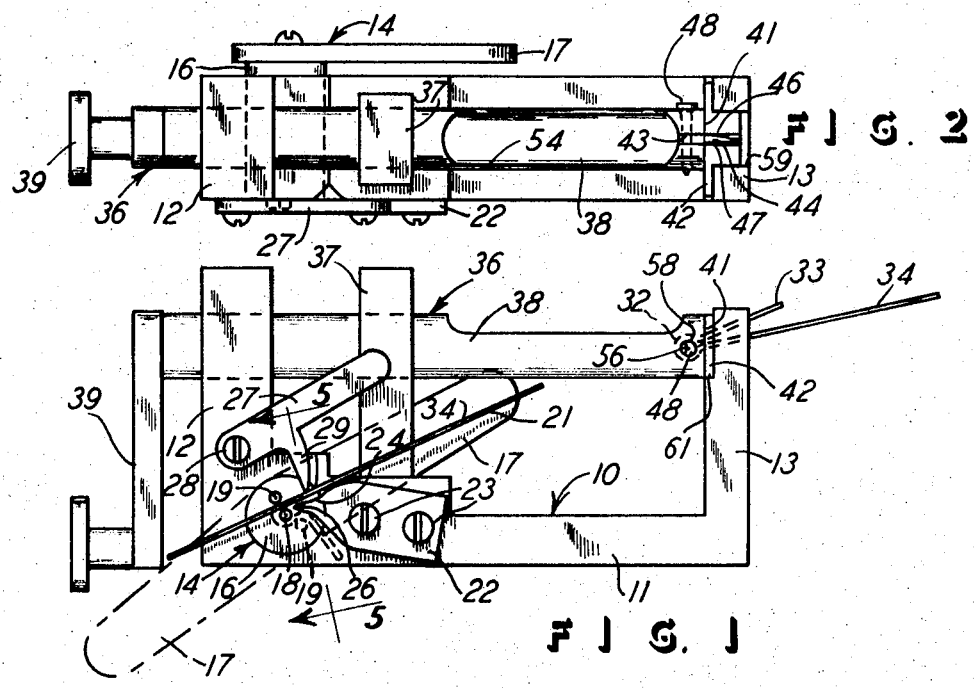
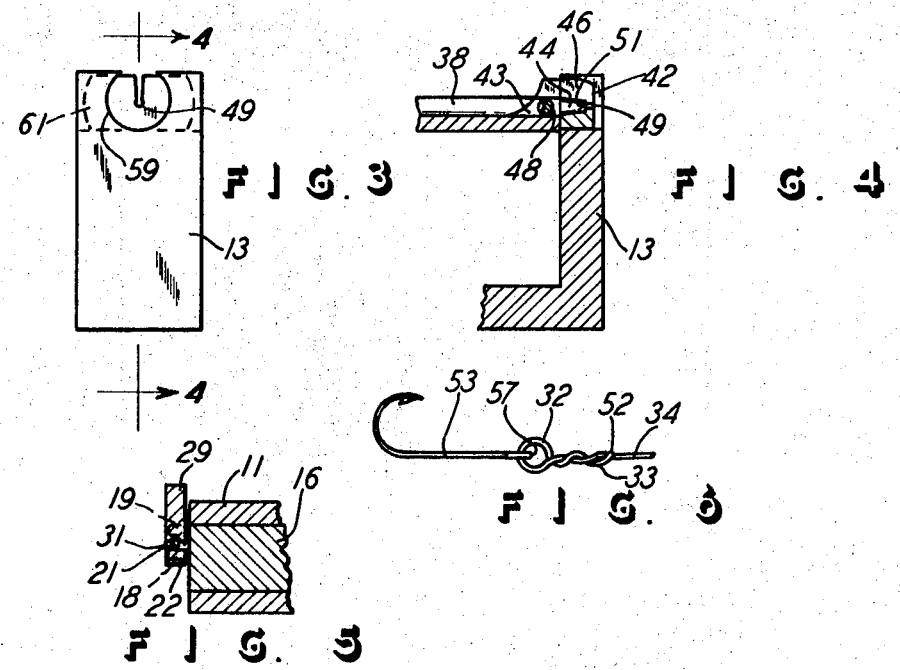
INVENTOR:
JOSEPH J. YUST
BY: *Arthur J. Hansemann*
ATTORNEY

United States Patent Office 3,340,905
Patented Sept. 12, 1967

3,340,905
WIRE TIER AND CUTTER
Joseph J. Yust, 1509 Chatham St., Racine, Wis. 53402
Filed June 21, 1965, Ser. No. 465,364
5 Claims. (Cl. 140—104)

ABSTRACT OF THE DISCLOSURE

A wire tier and cutter for making entwined wire for fish hooks and the like. A wire twister piece is rotatable on a support by means of a handle, and the piece includes a pin for engaging a loop in the wire. The loop extends into a groove in the support piece, and the groove has a cutter therein and is restricted at one end so that upon twisting the wire, one leg of the looped wire will be automatically severed as the wire is twisted by the rotatable twister. Also, pin means are provided on the support for placing the initial loop in the wire.

---

This invention relates to a wire former and cutter, especially the type used in attaching fish hooks, lures, and the like.

Frequently, a need arises for a wire former and cutter which can be employed for twisting a wire and cutting it after the wire has been attached to another item such as a fish hook or lure in the instance where such use is desired. Particularly, in the instance with fishermen, it is desirable to be able to tie and assembled certain fishing equipment, such as the various hooks and lures, at the place where the fishing is being done. This of course preferably requires that a portable and small device be empolyed so that a straight piece of wire can be formed, twisted, and cut at the location of fishing so that the fisherman can select the particular lures or hook he desires at the moment.

Accordingly, it is an object of this invention to provide a wire forming, twisting, and cutting device which will achieve the aforementioned purposes, and which is simple to operate in the several functions mentioned. It is a further object of the invention to provide a device of the type mentioned and to do so with an inexpensive and easily manufactured device.

A more specific object of this invention is to provide a wire former, twister, and cutter wherein the cutting action is incorporated into the function of the wire twister, and the wire is cut at a most desirable location, namely, immediately adjacent the companion branch or leg of the wire with the cut being very celan and close to the companion branch.

Still another object of this invention is to provide a wire former, twister, and cutter which can be either portable or stationary, that is, the device is so arranged that it can either be placed on a bench or table or it can be simply held in the hand while it is being operated to fully form the wire as mentioned.

Other objects and advantages will become apparent upon reading the following description in light of the accompanying drawings, wherein:

FIG. 1 is a side elevational view of a preferred embodiment of this invention and showing one part thereof in a second position in dot-dash lines, and showing a wire formed thereon and in a second position in dotted lines.

FIG. 2 is a top plan view of FIG. 1 with the wire removed.

FIG. 3 is an end view of FIG. 1.

FIG. 4 is a sectional view taken on the line 4—4 of FIG. 3.

FIG. 5 is a sectional view taken on the line 5—5 of FIG. 1.

FIG. 6 is a view of the wire finally twisted and cut and attached to a fish hook.

The device is shown to consist of a mounting or frame piece 10 which is generally U-shaped and has a base 11 and legs 12 and 13. A wire twister, generally designated 14, is rotatably mounted on the piece 10 and includes the shaft 16 which is shown to be extending through the mounting piece 10 and rotatably supported therein. A handle 17 is secured to the shaft 16 to rotate the latter. Thus the handle 17 may be rotated between the solid line position of FIG. 1 and the dot-dash line position shown, with the rotation being in the counter-clockwise direction.

The shaft 16 carries a center post 18 and an eccentric finger or pin 19 which also moves to the dotted position shown in FIG. 1 upon rotation of the shaft 16. The post 18 and finger 19 project beyond the end of the shaft 16, as shown in FIG. 5, and they thus engage the wire 21 which is to be formed, twisted, and cut as described hereinafter.

A stationary jaw 22 is attached to the mounting piece 10 by screws 23, and it has a shoulder 24 disposed below the wire 21. Also, a point 26 extends out the jaw 22 to a position adjacent the center post 18. A movable jaw 27 is pivotally mounted on the piece 10 by a screw 28. A finger 29 extends on the jaw 27 to engage the wire 21 and hold it against the shoulder 24.

FIG. 5 shows that the finger 29 is V-shaped at its lower edge 31 so that it grips the wire 21 and secures it against the stationary jaw 22 upon downward pivotal motion of the jaw 27.

Rotation of the former 14 then displaces the finger 19 from the solid line position shown to the dotted line position, and this forms a hairpin bend in the wire 21, as indicated by the dotted lines in FIG. 1 and the wire 21.

The wire then has the loop designated 32 and the two legs 33 and 34, and it is shown in a second position in FIG. 1 on the upper end of the mounting piece leg 13.

A wire twister and cutter 36 is rotatably mounted in the piece 10 by extending through the leg 12 and through a support 37 which is an integral part of the piece 10. The twister 36 is shown to consist of the cylindrical portion 38 and the handle 39 attached thereto. Thus movement of the handle 39 will cause the cylindrical portion 38 to rotate in the mounting piece 10. The end 41 of the piece 38 abuts a guide and cutter piece 42 secured in the upper end of the leg 13. FIG. 2 shows that the piece 38 has an opening 43 which receives the loop 32 of the wire, and the member 42 also has an opening 44 which receives the legs 33 and 34 of the wire. The opening 44 is defined by walls 46 and 47 on the member 42.

Further, a pin 48 is removably mounted on the piece 38 to extend through the wire loop 32 and thereby cause the loop 32 to rotate with the rotation of the twister 36.

With the wire in the position shown in FIG. 1, that is, with the legs 33 and 34 extending in the opening 44 of the member 42, rotation of the twister 36 will cause the wire legs 33 and 34 to entwine or twist with each other, such as shown in FIG. 6.

FIGS. 2 and 4 show that the opening 44 is aligned with and adjacent the opening 43 and is relatively large. The opening 44 extends to a smaller opening 49 in the member 42. A cutting edge or shoulder 51 is formed between the openings 44 and 49. The arrangement is such that the wire commences twisting adjacent the loop 32, and the legs 33 and 34 continue to twine until the two legs reach the cutting edge 51 at which point both the legs 33 and 34 cannot fit into the small opening 49, and thus one of the legs is severed by the cutting edge 51 when rotation of the twister 36 is continued. FIG. 6 shows the leg 33 has been cut at its end 52, and such cut is clean and flush with the remaining leg 34 so there is no projecting spur or the like on the leg 33.

Of course before the wire is twisted as shown in FIG.

6, a hook 53 is shown to have been attached to the wire at the loop 32, and then the twisting and cutting of the wire will secure the hook thereto. The piece 38 has a cut-out or opening 54 which receives the hooks 53 or any other attachment or lure when the wire is being twisted as described. Further, the pin 48 has a side opening 56 which also is arranged to accommodate the hook 53, and specifically its end 57. With this arrangement, the pin 48 can be slid into and out of the opening 58 in the piece 38 for placement and removal of the wire in the twisting operation.

It will therefore be understood that the twister 36 is effective to twist the legs of the wire and to cut one of the legs with only several turns of the handle 39. The cutting is automatically accomplished and is by virtue of the fact that the opening 44 will receive both legs 33 and 34 of the wire, but the opening 49 will receive only one of these legs and thus the other one must be cut by the shoulder or edge 51. Therefore the opening 49 is of a size less than the double size of the diameter of the wire 21. Thus the usual operation of cutting the one leg with a pliers and then filing the cut leg so that it does not project is not necessary with this device. There is no final touch up of filing the cut end 52 as it is already severed completely flush with the remaining leg 34. Also, both legs 33 and 34 are formed or twisted, and not just one leg is twisted about a straight leg, but both legs are twisted and deformed as mentioned.

The piece 42 can be slipped into and out of an opening 59 in the leg 13, and wings 61 on the piece 42 secure the piece on a shoulder 61 on the end 13. Thus the piece can be replaced if desired.

After forming the wire 21 and attaching the hook 53 or the like, as shown in FIG. 6, the leg 34 of the wire can be likewise looped, twisted, and cut after attaching a leader line or the like. The opening 54 in the twister 36 will accommodate the hook 53 at this time.

While a specific embodiment of this invention has been shown and described, it should be obvious that certain changes could be made in the embodiment and the invention should be determined only by the scope of the appended claims.

What is claimed is:

1. A wire tier and cutter for attaching fish lures or the like, comprising a mounting piece, a wire former rotatably disposed on said mounting piece and including a center post about which a wire can be formed and including a finger orbital about said center post for engaging said wire and forming it into a loop and two legs, a handle on said former for rotating the latter to form said loop, a wire twister rotatably disposed on said mounting piece and having an opening for receiving said wire and said loop, means included in said twister for engaging said loop to rotate said wire with the rotation of said twister, a handle on said twister for rotating the latter, said mounting piece being provided with restraining walls adjacent said twister and aligned with said opening for receiving said legs of said wire between said walls to hold said legs while said twister is being rotated to have said legs entwine with each other, and a cutting edge on said mounting piece at the ends of said walls opposite said opening and disposed to engage one of said legs upon rotation of said twister for severing said leg after said legs are entwined.

2. A wire tier and cutter for attaching fish lures or the like, comprising a mounting piece, a wire former rotatably disposed on said mounting piece and including means for engaging said wire and forming it into a loop and two legs, a handle on said former for rotating the latter to form said loop, a wire twister rotatably disposed on said mounting piece, means included in said twister for engaging said loop to rotate said wire with the rotation of said twister, a handle on said twister for rotating the latter, a wire cutter on said mounting piece and provided with spaced-apart restraining walls adjacent said twister for receiving said legs of said wire between said walls to hold said legs while said twister is being rotated to have said legs entwine with each other adjacent said loop, said wire cutter having a cutting edge adjacent said walls and spaced from said twister, said wire cutter having a hole of a cross-sectional size less than the spacing between said restraining walls and on the opposite side of said cutting edge and arranged to receive only one of said legs at a time to force the other of said legs against said cutting edge upon rotation of said twister for severing said other leg after said legs are entwined.

3. A wire tier and cutter comprising a mounting piece, a wire twister rotatably disposed on said mounting piece, means included in said twister for engaging a loop in a wire to rotate said wire with the rotation of said twister, a handle on said twister for rotating the latter, a wire cutter on said mounting piece and provided with spaced-apart restraining walls adjacent said twister for receiving said legs of said wire between said walls to hold said legs while said twister is being rotated to have said legs entwine with each other adjacent said loop, said wire cutter having a cutting edge adjacent said walls and spaced from said twister, said wire cutter having a hole of a cross-sectional size less than the spacing between said restraining walls and on the opposite side of said cutting edge and arranged to receive only one of said legs at a time to force the other of said legs against said cutting edge upon rotation of said twister for severing said other leg after said legs are entwined.

4. A wire tier and cutter comprising a mounting piece, a wire former for engaging said wire and forming it into a loop and two legs, a wire twister rotatably disposed on said mounting piece and including means for engaging said loop to rotate said wire with the rotation of said twister, a handle on said twister for rotating the latter, said mounting piece being provided with a restraining wall adjacent said twister and aligned with said means to hold said legs of said wire while said twister is being rotated to have said legs entwine with each other adjacent said loop, and a cutting edge on said mounting piece adjacent said wall and opposite said means and adapted to engage one of said legs upon rotation of said twister for severing said leg after said legs are entwined.

5. A wire tier and cutter comprising a mounting piece, a wire twister rotatably disposed on said mounting piece and including means for engaging said loop to rotate said wire with the rotation of said twister, a handle on said twister for rotating the latter, said mounting piece being provided with a restraining wall adjacent said twister and aligned with said means to hold said legs of said wire while said twister is being rotated to have said legs entwine with each other adjacent said loop, and a cutting edge on said mounting piece adjacent said wall and opposite said means and adapted to engage one of said legs upon rotation of said twister for severing said leg after said legs are entwined.

References Cited

UNITED STATES PATENTS

| | | | |
|---|---|---|---|
| 1,316,257 | 9/1919 | Snell | 140—104 |
| 2,006,355 | 7/1935 | Howell | 140—104 |
| 2,481,587 | 9/1949 | Gregory | 140—104 |
| 2,570,575 | 10/1951 | Lindbloom | 140—102.5 |
| 3,221,779 | 12/1965 | Noel | 140—104 |

CHARLES W. LANHAM, *Primary Examiner.*

E. M. COMBS, *Assistant Examiner.*